US009351041B2

(12) United States Patent
Johnson et al.

(10) Patent No.: US 9,351,041 B2
(45) Date of Patent: *May 24, 2016

(54) PROCESS FOR PROVIDING TARGETED USER CONTENT BLENDED WITH A MEDIA STREAM

(71) Applicant: Advertising.com LLC, Dulles, VA (US)

(72) Inventors: Jayne F. Johnson, McLean, VA (US); G. Thomas Desjardins, Annandale, VA (US)

(73) Assignee: Advertising.com LLC, Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/623,030

(22) Filed: Feb. 16, 2015

(65) Prior Publication Data

US 2015/0208126 A1    Jul. 23, 2015

Related U.S. Application Data

(63) Continuation of application No. 13/929,271, filed on Jun. 27, 2013, now Pat. No. 8,973,030, which is a continuation of application No. 12/561,837, filed on Sep. 17, 2009, now Pat. No. 8,495,674, which is a continuation of application No. 09/479,807, filed on Jan. 8, 2000, now Pat. No. 7,610,597.

(51) Int. Cl.
*H04N 21/435* (2011.01)
*H04N 21/235* (2011.01)
(Continued)

(52) U.S. Cl.
CPC ............. *H04N 21/458* (2013.01); *G06Q 30/02* (2013.01); *H04N 7/163* (2013.01); *H04N 21/438* (2013.01);
(Continued)

(58) Field of Classification Search
CPC .................................. H04N 7/10; H04N 7/173
USPC ................................................. 725/32, 92, 98
See application file for complete search history.

(56) References Cited

U.S. PATENT DOCUMENTS 5,053,955 A   10/1991   Peach et al.
5,155,591 A   10/1992   Wachob
(Continued)

FOREIGN PATENT DOCUMENTS

EP    0 811 942    12/1997
EP    0 822 535    4/1998
(Continued)

OTHER PUBLICATIONS

Anonymous, "RealAudio pumps up beta sites," Interactive Age, Jun. 19, 1995, p. 21.
(Continued)

*Primary Examiner* — Kieu Oanh T Bui
(74) *Attorney, Agent, or Firm* — Finnegan, Henderson, Farabow, Garrett & Dunner LLC

(57) ABSTRACT

A network system provides delivery of customized target content, such as advertising, to individual users. There is transmission of a common spot content stream to a large group of the users. Each home client user communicates through a telecommunications network, such as the Internet, for connection to a portal to receive continuing media, such as streaming audio or video. The user installs receiver software at his home client processor for receiving both the streaming media and a content stream. The media stream includes spot markers placed at appropriate locations in the media stream by the publisher to designate locations for insertion of spot content and optionally to identify specific characteristics of the media stream. The content stream includes content units, such as audio advertising, together with spot content frames, which include parameters having values designated by the spot content provider to be the target audience. A profile is produced at the home client having parameters with values associated with the home client user, such as geographic and demographic information. The receiver software at the home client matches the spot content frame for each spot content to the profile of the user to select those spot content units which have a match. These selected spot content units are stored at the home user and are blended into the media stream at the locations of the spot markers to produce an information data stream for the user that is customized for that user. A spot auditor at the home client measures the type and quantity of play back of the spot content received by the home user and this is reported to the spot content provider for measurement of the effectiveness in the distribution of the spot content.

20 Claims, 7 Drawing Sheets

(51) Int. Cl.
  *H04N 21/458* (2011.01)
  *G06Q 30/02* (2012.01)
  *H04N 7/16* (2011.01)
  *H04N 21/433* (2011.01)
  *H04N 21/45* (2011.01)
  *H04N 21/81* (2011.01)
  *H04N 21/845* (2011.01)
  *H04N 21/438* (2011.01)

(52) U.S. Cl.
  CPC ....... *H04N 21/4331* (2013.01); *H04N 21/4524* (2013.01); *H04N 21/4532* (2013.01); *H04N 21/812* (2013.01); *H04N 21/8455* (2013.01)

(56) References Cited

U.S. PATENT DOCUMENTS

| | | |
|---|---|---|
| 5,260,778 A | 11/1993 | Kauffman et al. |
| 5,319,455 A | 6/1994 | Hoarty et al. |
| 5,321,604 A | 6/1994 | Peach et al. |
| 5,341,350 A | 8/1994 | Frank et al. |
| 5,347,632 A | 9/1994 | Filepp et al. |
| 5,404,566 A | 4/1995 | Wehrmeyer |
| 5,412,416 A | 5/1995 | Nemirofsky |
| 5,446,919 A | 8/1995 | Wilkins |
| 5,491,838 A | 2/1996 | Takahisa et al. |
| 5,515,098 A | 5/1996 | Carles |
| 5,541,638 A | 7/1996 | Story |
| 5,572,442 A | 11/1996 | Schulhof et al. |
| 5,604,542 A | 2/1997 | Dedrick |
| 5,636,346 A | 6/1997 | Saxe |
| 5,652,615 A | 7/1997 | Bryant et al. |
| 5,661,516 A | 8/1997 | Carles |
| 5,682,525 A | 10/1997 | Bouve et al. |
| 5,696,965 A | 12/1997 | Dedrick |
| 5,704,017 A | 12/1997 | Heckerman et al. |
| 5,708,478 A | 1/1998 | Tognazzini |
| 5,710,884 A | 1/1998 | Dedrick |
| 5,717,923 A | 2/1998 | Dedrick |
| 5,721,827 A | 2/1998 | Logan et al. |
| 5,724,521 A | 3/1998 | Dedrick |
| 5,726,909 A | 3/1998 | Krikorian |
| 5,734,119 A | 3/1998 | France et al. |
| 5,752,238 A | 5/1998 | Dedrick |
| 5,754,787 A | 5/1998 | Dedrick |
| 5,758,257 A | 5/1998 | Herz et al. |
| 5,761,601 A | 6/1998 | Nemirofsky et al. |
| 5,768,521 A | 6/1998 | Dedrick |
| 5,793,980 A | 8/1998 | Glaser et al. |
| 5,818,972 A | 10/1998 | Girod et al. |
| 5,835,487 A | 11/1998 | Campanella |
| 5,864,546 A | 1/1999 | Campanella |
| 5,867,490 A | 2/1999 | Campanella |
| 5,870,390 A | 2/1999 | Campanella |
| 5,872,588 A | 2/1999 | Aras et al. |
| 5,873,068 A | 2/1999 | Beaumont et al. |
| 5,898,680 A | 4/1999 | Johnstone et al. |
| 5,913,040 A | 6/1999 | Rakavy et al. |
| 5,917,830 A | 6/1999 | Chen et al. |
| 5,931,901 A | 8/1999 | Wolfe et al. |
| 5,933,811 A | 8/1999 | Angles et al. |
| 5,948,061 A | 9/1999 | Merriman et al. |
| 5,991,735 A | 11/1999 | Gerace |
| 6,016,509 A | 1/2000 | Dedrick |
| 6,026,368 A | 2/2000 | Brown et al. |
| 6,029,045 A | 2/2000 | Picco et al. |
| 6,094,677 A | 7/2000 | Capek et al. |
| 6,151,600 A | 11/2000 | Dedrick |
| 6,198,906 B1 | 3/2001 | Boetje et al. |
| 6,247,946 B1 | 6/2001 | Nakamura et al. |
| 6,248,946 B1 | 6/2001 | Dwek |
| 6,324,519 B1 | 11/2001 | Eldering |
| 6,338,044 B1 | 1/2002 | Cook et al. |
| 6,463,585 B1 | 10/2002 | Hendricks et al. |
| 6,493,872 B1 | 12/2002 | Rangan et al. |
| 6,552,254 B2 | 4/2003 | Hasegawa et al. |
| 6,577,716 B1 | 6/2003 | Minter et al. |
| 6,698,020 B1 | 2/2004 | Zigmond et al. |
| 6,820,277 B1 | 11/2004 | Eldering et al. |
| 7,401,097 B1 | 7/2008 | Baer et al. |
| 2001/0023436 A1 | 9/2001 | Srinivasan et al. |
| 2002/0023274 A1 | 2/2002 | Giacalone |
| 2002/0083435 A1 | 6/2002 | Blasko et al. |
| 2002/0178054 A1 | 11/2002 | Ader |
| 2002/0184047 A1 | 12/2002 | Plotnick et al. |
| 2003/0056222 A1 | 3/2003 | Iwata et al. |
| 2003/0058707 A1 | 3/2003 | Dilger et al. |
| 2003/0120541 A1 | 6/2003 | Siann et al. |
| 2003/0139966 A1 | 7/2003 | Sirota et al. |
| 2003/0225629 A1 | 12/2003 | Banks et al. |
| 2004/0093327 A1 | 5/2004 | Anderson et al. |
| 2005/0097593 A1 | 5/2005 | Raley et al. |
| 2005/0154746 A1 | 7/2005 | Liu et al. |
| 2005/0193410 A1 | 9/2005 | Eldering |
| 2005/0229209 A1 | 10/2005 | Hildebolt et al. |

FOREIGN PATENT DOCUMENTS

| | | |
|---|---|---|
| WO | WO 97/41673 | 11/1997 |
| WO | WO 00/77655 | 12/2000 |

OTHER PUBLICATIONS

Notice of Allowance issued in U.S. Appl. No. 09/479,807, mailed Jun. 16, 2009.

Office Action issued in U.S. Appl. No. 09/479,807, mailed Apr. 19, 2002.

Office Action issued in U.S. Appl. No. 09/479,807, mailed May 23, 2003.

Office Action issued in U.S. Appl. No. 09/479,807, mailed Dec. 17, 2003.

Office Action issued in U.S. Appl. No. 09/479,807, mailed Jul. 6, 2004.

Office Action issued in U.S. Appl. No. 09/479,807, mailed Jun. 15, 2006.

Office Action issued in U.S. Appl. No. 11/023,638, mailed Oct. 17, 2008.

Office Action issued in U.S. Appl. No. 11/341,873, mailed Oct. 17, 2008.

Office Action issued in U.S. Appl. No. 11/023,638, mailed Apr. 15, 2009.

Office Action issued in U.S. Appl. No. 13/929,271, mailed May 22, 2014.

PROCESS FOR PROVIDING TARGETED USER CONTENT BLENDED WITH A MEDIA STREAM

CROSS REFERENCE TO RELATED APPLICATIONS

This application is a continuation of U.S. application Ser. No. 13/929,271, filed Jun. 27, 2013 (now allowed), which is a continuation of U.S. application Ser. No. 12/561,837, filed Sep. 17, 2009 (now U.S. Pat. No. 8,495,674), which is a continuation of U.S. application Ser. No. 09/479,807, filed Jan. 8, 2000 (now U.S. Pat. No. 7,610,597). The contents of the above-referenced applications are expressly incorporated herein by reference to their entireties.

TECHNICAL FIELD OF THE INVENTION

The present invention pertains in general to providing targeted content to a user, and in particular to such media and content advertising that is conveyed via a broadcast medium such as the Internet.

BACKGROUND OF THE INVENTION

Most online advertising, typically through the Internet, is accomplished via the use of an ad-server technology where a placeholder tag is used on the online publishers webpage and a request is made to the ad-server, which may be located anywhere in the internet, to fill in the space. A number of companies have been created to fill the need to serve and manage these advertisements for these online content publishers. These ad-servers and ad-management companies have been some of the fastest growing companies in the Internet marketplace.

There is a serious problem with online advertising which uses a banner ad. As the user's desktop becomes more complex and cluttered, the effectiveness of banner advertising diminishes. Advertisers and advertising agencies are seeking more effective channels on the Internet to get their message to the consumer. As a result, interstitial advertising has become and will likely continue to be an increasingly important factor in online advertising. Interstitials are those ads that break the proscenium of the web browser by either opening up a new window, or specific application, in order to draw the attention to the user. This occurs often at the annoyance of the user since it clutters the workplace even further. These methods have proven successful though as click through rates have increased dramatically, especially for media rich ads that clearly require the attention of the user. A problem with media-rich ads is that they are not tightly bound to the content that the publisher is providing. Further these ads typically require substantial buffering before they can be played by the consumer. This buffering causes delays in the presentation of the ad, and except for those users with very fast internet connections there is an unsatisfactory experience.

It is important to note that streaming media publishers now have few or no audio ads in play on their sites. The reason for this resides in a number of technology problems that exist in the delivery of streaming audio advertising. Most notably that streaming audio, unlike its webpage cousin, cannot tolerate the delays and buffering that a traditional ad-server technology uses. Thus, there exists a need for a process to provide content, such as advertising, efficiently and effectively in conjunction with a media stream.

SUMMARY OF THE INVENTION

The present invention relates to processes for providing targeted spot content, such as advertising, to users of a continuing media, for example, streaming audio. A media stream is produced which is interspersed with spot markers and this media stream is provided concurrently to the processors for a plurality of the users. The spot markers identify locations in the media stream for insertion of the spot content. A user profile is provided at each of the processors wherein the profile has a plurality of parameters, such as geographic and demographic, having values of the parameters associated with the user of the processor. A content stream is provided concurrently to each of the processors. The content stream includes a sequence of spot contents with each spot content having a related frame which includes at least one of the parameters corresponding to the user profile and including values for the parameters. At each processor, the spot content frame is examined to determine if it has values for one or more of its parameters which match values for one or more of the corresponding parameters of the user profile associated with the processor. The spot content corresponding to the frames which match the user profile are selected for use at the processor. At each processor a user information stream is generated which comprises the media stream with the selected spot contents inserted at the locations of, and in place of, the spot markers in the media stream thereby producing a customized information data stream for a particular user.

A further aspect of the present invention is the auditing of the spot content that is played at each home client user. A log is maintained for identifying the actual spot content, typically advertisements, played at a user together with the profile for the user. This log is periodically transferred back to the provider of the spot content for determining the effectiveness of an advertising campaign utilizing the spot content in conjunction with the media stream.

The present invention has aspects specifically pertaining to a media publisher, a spot content provider and to a home client user.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION

Figure 1:
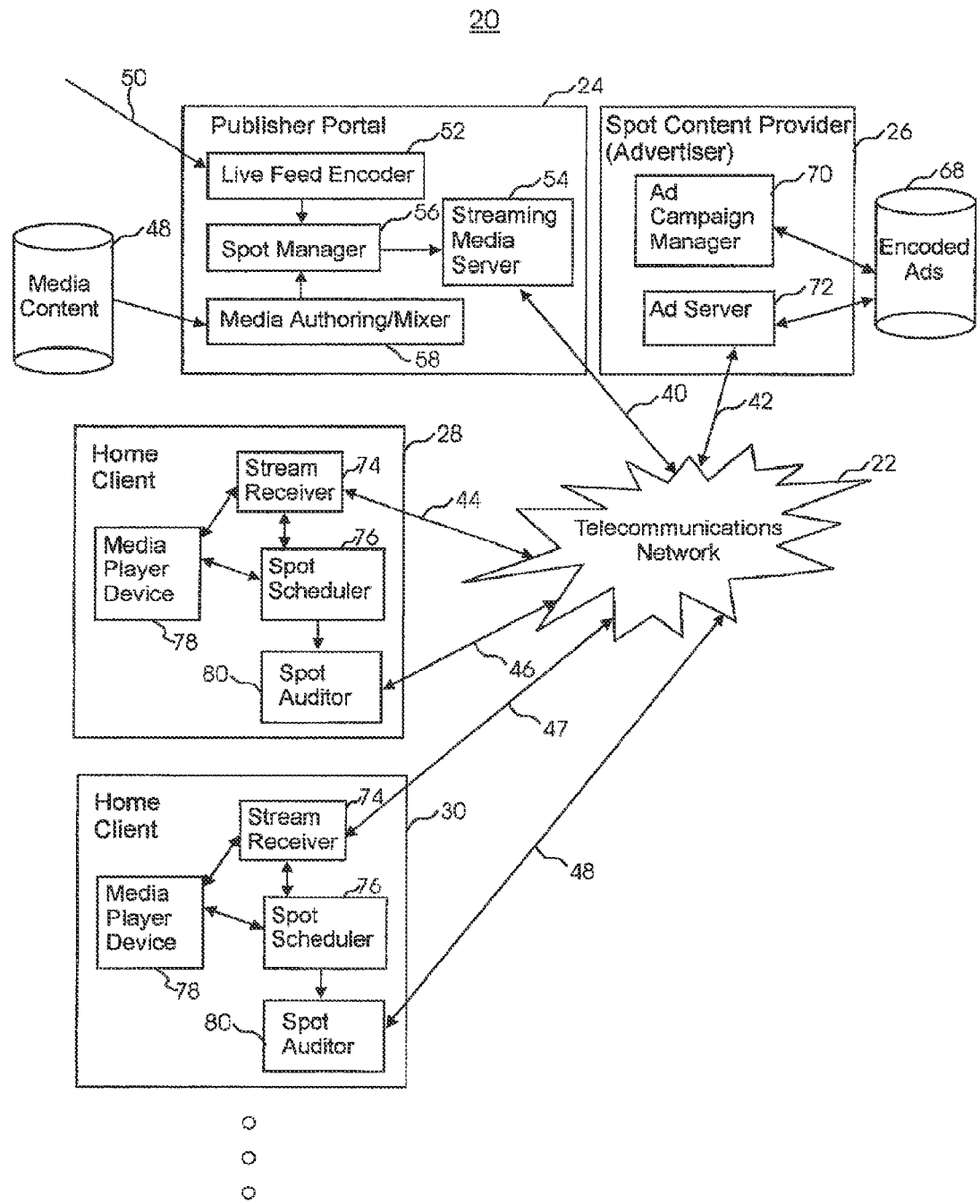
FIG. 1 is a network topology illustrating an implementation of the present invention.

The present invention is a system in which content is distributed to a targeted audience. The content may comprise advertisements, local reports, weather, pubic announcements, each of which is generally relevant to a specific audience. The content is preferably in a form of streaming media such as audio or video, but may take other forms such as text. Conventional synchronous broadcast methods send identical content globally to all users. Synchronous multicast methods send multiple streams of content, each of which is received identically at all user terminals, and is meant to be played back in the order in which it is received. In contrast, the process of the present invention is directed for delivering content in a hierarchical and efficient fashion from a number of sources asynchronously. The present invention may also include the transport of isosynchronous traffic, that is, traffic which contains an inherent concept of time. The content transmitted in the present system may be further shared and redistributed between users.

The transmitted content may be bound, that is, associated, with other content, such as advertisements, and other audience service announcements. The content can be provided from a variety of sources that include, but are not limited to, terrestrial sources such as cellular, including GSM, radio stations broadcasting in an appropriate range, infrared ports on nearby units, un-tethered media players and the Internet.

The content is organized by groups, and the groups are organized hierarchically. Content may inherit properties hierarchically. There are two major types of content properties. These properties are membership and action. These properties may affect the binding to other content. One type is membership binding. These properties may also bind content to actions to be performed on the content, such as the time in which content may be reviewed, frequency of playback, and duration of validity of content. These latter properties are deemed to be action binding.

Content may be tied to or excluded from a particular region, which is an example of membership binding. Action binding may be of a positive or negative nature. An example of negative binding is a requirement to delete content when a time period has elapsed.

Messages can also be sent to users to affect the content. The messages can have IDs. These IDs are used to serialize the message for uniqueness. A further aspect is that individual messages can be acknowledged. The messages can also be protected by an encryption technique, or authenticated by a signature. The encryption is typically associated, bound, with a particular group membership such that only members of that group may understand the contents of the message. The messages described herein comprise spot markers and spot content frames.

The recipient programs (receivers) which, are implemented by Internet users in accordance with the present invention may also have properties. These properties include both action and membership bindings. A receiver may belong to either a group or a series of groups. A receiver may infer actions or membership from certain messages, or from the lack of certain messages. An example of such a message is that all receivers that receive a certain message are members of a certain group, while the failure to receive such a message indicates that a receiver is not a member of that group. Receiver behavior may be modified as a result of the receipt of a message. Such a message may be unique to a particular receiver or it may comprise information intended for a group of receivers. The message can come from any valid source. In particular, behavior may have time duration, or a period of validity, after which the behavior may no longer be enforced or applicable. One property that is unique to a single receiver is the receiver ID. The receiver IDs are unique within the entire world and are eternally valid. A further property of a receiver is that it has the concept of local time and date. A receiver may maintain multiple views of the world. This is useful for receivers that are used in multiple geographically distinct environments or in diverse roles. A receiver may coordinate its behavior with other receivers, devices or subsystems within the same device.

The present invention provides a process for the concurrent transmission of a content stream, such as advertisements, to a plurality of home client users, each of which is also receiving a media stream from a publishing portal. A profile is produced or provided at a home client user that has information associated with that particular user. There are a plurality of transmitted spot content units in a stream and associated with each spot content unit is a spot content frame which has parameters that correspond to parameters in the local user profile. The parameters in the spot content frame are assigned particular values by the spot content provider, typically an advertiser. At the user processor, each received spot content frame is checked to determine if that spot content is associated with the particular user and therefore should be stored. Other spot content is ignored.

A media stream, such as musical entertainment, is provided to the user with a series of interspersed spot markers for designating insert points within the media stream for the spot content units. At the user, the selected spot content is inserted at the locations of the spot markers to produce an information data stream that is customized for the particular user. Thus, the present invention has the advantage of universal broadcast of the same data stream to all users but customization at the user to produce targeted content for the user in conjunction with a media stream that has been selected by the user.

A topology 20 which represents an application of the present invention is shown in FIG. 1. This embodiment represents the conventional Internet. The communications portion of the Internet is represented by the a telecommunications network 22. The system includes a publisher portal 24, a spot content provider 26 and a plurality of home clients represented by home clients 28 and 30. Each of the entities 24, 26, 28 and 30 is connected to the telecommunications network 22 by a bi-directional communication channel of any type such as telephone, cable, Internet and satellite. These are respectively channels 40, 42, 44, 46, 47 and 48. Multiple channels, such as 44 and 46 can be carried by a single communication line.

The publisher portal 24 receives content from a storage 48, which is typically a disk drive. Live, rather than recorded content, is received via a line 50.

The publisher portal 24 includes a live feed encoder 52 which encodes the live media stream received via line 50 and provides it to a conventional streaming media server 54. In the preferred embodiment of the present invention, the streaming media is audio, however, streaming video may also be used, as well as sequential text. The portal 24 further includes a spot manager 56 which receives the contents recorded in the storage 48 and inserts spot markers in the resulting stream, further described in reference to FIG. 2, which is provided to the server 54. The portal 24 further includes a media authoring/mixer 58 which produces and manages the media content which is recorded at the storage 48.

The spot content provider 26 is preferably a site that provides a source of advertising content which is recorded on a storage 68. The creation, management and operation of the ads recorded on the storage 28 is performed by an ad campaign manager 70. An ad server 72 receives the encoded ads from the storage 68 and provides them via the line 42 through the telecommunications network 22. The ad server 72 can handle a large number of ad campaign managers 70 concurrently. Thus, the present invention can conduct multiple advertising campaigns at one time.

The network shown in FIG. 1 represents one instance of the present invention. A full representation of a network employing the present invention includes multiple publisher portals, multiple spot content provider and a large number of home clients.

The system shown in FIG. 1 illustrates two home clients 28 and 30 which are representative of a very large number of potential home client users in the Internet. Home client 28 will be described as representative of all the home clients. Home client 28 includes a stream receiver 74 which communicates respectively through the channel 44 to the telecommunications network 22. The stream receiver 74 works with a spot scheduler 76, further described below, to produce a blended data stream that is provided to a media player device 78. Representative media player devices include a web based MP3 player, tethered MP3 player, cellular (untethered) MP3 player, or embedded (PDA) MP3 player. The home client 28 further includes a spot auditor 80 which is further described below.

Figure 2:
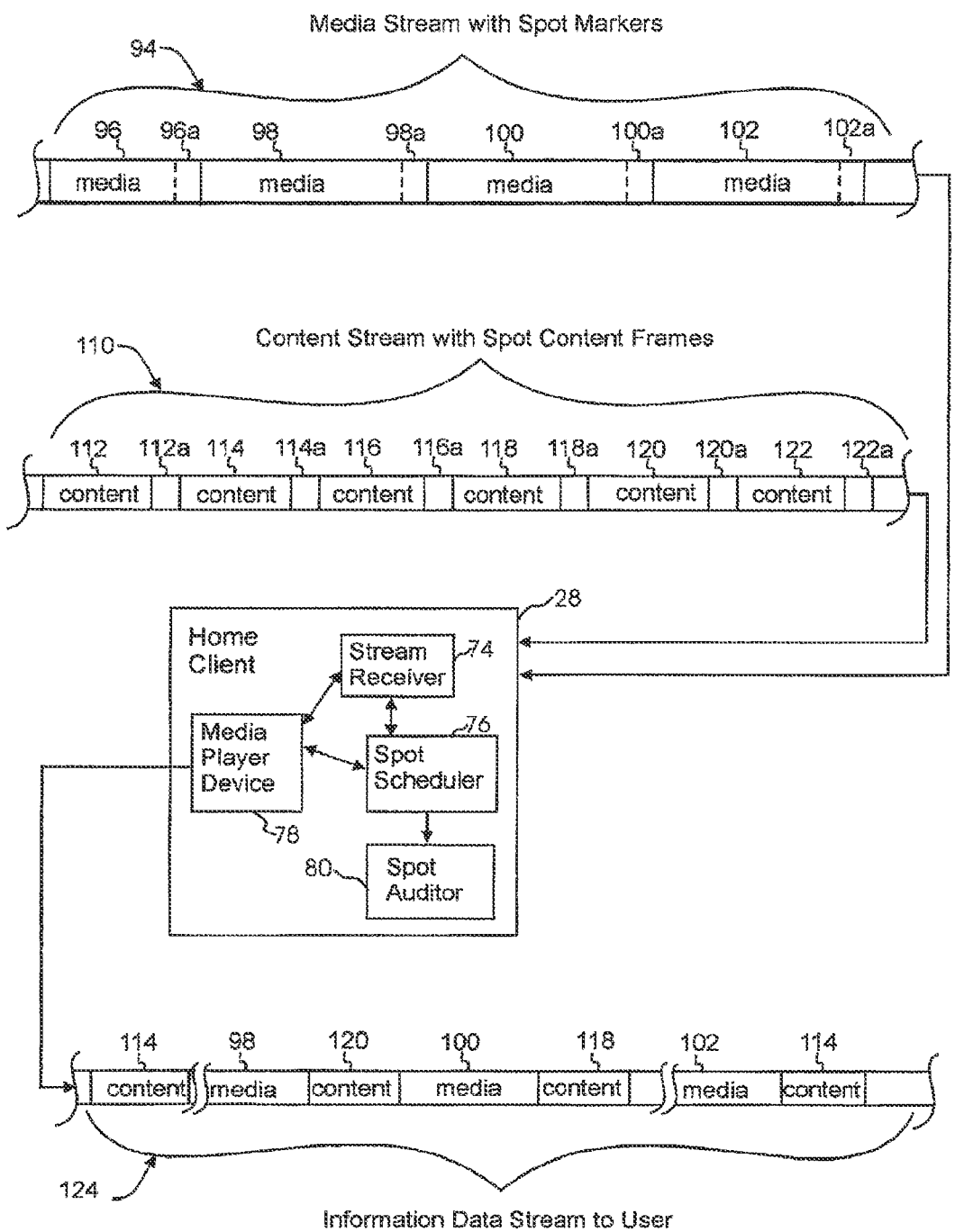
FIG. 2 is a schematic illustration of a media stream and content stream transmitted to a home client and the production of a blended information data stream targeted to the home client user.

FIG. 2 is a representation of data flow and processing in accordance with the present invention. A media stream 94 comprises media units 96, 98, 100 and 102. Interspersed in the media stream adjacent to the media units are spot markers that correspond to the adjacent media unit. These are markers 96a, 98a, 100a and 102a. The content of the spot markers is shown in Table 1.

TABLE 1

A. Frame Identifier: (4 bytes):
B. Size (4 bytes):
    The size file ignores the 8 bit of each byte. Shift the four fields together to form a 28 bit size.
    The 28 bit value is the number of bytes of the Frame not including the Frame Header of 10 bytes.
    The Frame Header is the Frame Identifier, the Size, and the Flag Fields.
    If the Spot Type is an Ad then the Length = 0x00000050

C. Flags (2 bytes - 1$^{st}$ Byte is in bit order is      X X X 0 0 0 0 0
                                                                                                  Read Only Bit (1 Read Only)
                                                                        File Alter Preservation Bit
                                                                                 0 – Preserve Frame
                                                                                 1 – Discard
                                                             Tag Alter Preservation
                                                                  0 – Frame Preserved
                                                                 1 – Discard 2$^{nd}$ Byte in bit order is      X X X 0 0 0 0 0
                                                                  Group Identity
                                                                  0 – No Group Identity
                                                                  1 – Group Identity
                                                             Encryption Flag
                                                                  0 – No Encryption
                                                                  1 – Use Encryption
                                                          Compression
                                                                  0 – Frame not compressed
                                                                  1 – Frame compressed For LC — 1$^{st}$ Byte = 0x20 and 2$^{nd}$ Byte = 0x00
D. URL: (29 bytes):
    This is a null terminated URL pointing to the originating point of contact. In our case:
    "http:\\www.lightningcast.net" followed by 0x00 for the Null Character:
X. Pad Byte (3 Byte) — 0x00 0x00 0x00
E. Magic Key 1 (4 bytes): - Reserved for Encryption Scheme for later versions
F. Magic Key 2 (4 bytes): Reserved for Encryption Scheme for later versions
G. Version Id (2 bytes):
    1$^{st}$ Byte — Major Revision Number (in our case 2)
    2$^{nd}$ Byte — Minor Revision Number (in our case 0)
H. Spot Type (2 bytes):
    0x0000 — (Invalid)
    0x0001 — Advertisement
    0x0002 — Traffic Report
    0x0003 — Weather Report
    0x0004 — Public Announcement
    0x0005 — 0xffff — Reserved for later versions
I. Publisher Id (4 bytes):
J. Ad Content Id (4 bytes):
K. Geographic Id 1 (4 bytes):
L. Geographic Id 2 (4 bytes):
M. Demographic Id 1 (4 bytes):
N. Demographic Id 2 (4 bytes):
O. Control Flags (2 bytes):
    0x0000 — Invalid
    0x0001 — Stop Ad Spot Replacement
    0x0002 — Start Ad Spot Replacement TABLE 1-continued P.  Membership Id (1 bytes):
    Local/Global — Reserved for use in future multicast versions
Q.  Discard Rule (1 byte):
    0x00 — Invalid
    0x01 — Drop Ad on Spot Exception
    0x02 — Alarm on Spot Exception
R.  Authentication Rule (4 byte)
    Reserved for future use
Y.  Spot Duratioin (2 bytes) — The duration is in the terms of seconds.
Z.  Reserved for Future Use (2 bytes)
1.  Category Id (4bytes) - The music style genre (ie: Classical, Jazz, Techno, Pop . . .)

In this example for media stream 94, spot markers have been interspersed in front of every media element unit. It is the discretion of the media publisher when utilizing the spot manager 56 to select where spot markers need to be placed. For example, a spot marker can be inserted into the media stream after every n media unit, or enter spot markers x, y, z after every seventh media unit, or any combination the media publisher desires. A media unit may comprise one or a group of songs.

A publisher can select media, such as music, and determine a plurality of insertion points where the spot markers should be, and the spot markers are then inserted for the media stream.

A content stream 110 comprises a series of content units 112, 114, 116, 118, 120 and 122. These content units may be, for example, audio advertisements having a length of 30 seconds or less. Associated with each content unit is a spot content frame having information related to the associated content unit. These comprise spot content frames 112a, 114a, 116a, 118, 120a and 122a. The spot content frames are further described below.

A frame is a block of data. Other terms corresponding to a frame are tag and header.

The spot content frame describes how to target the spot content element within the listening audience network. The spot content frame has the structure shown in Table 2.

TABLE 2

A.  DomainId—Identifies AdServer Domain
B.  ContentID—Identifies Content within an Adserver Domain
C.  ContentType—Identifies type of Content
    Announcement = 0x0100
    Control = 0x0200
    AdvertisementAnnouncement = 0x0101
    TrafficAnnouncement = 0x0102
    WeatherAnnouncement = 0x0103
    NewsAnnouncement = 0x0104
    PublicAnnouncement = 0x0105
    IdentificationAnnouncement = 0x0106
    CampaignControl = 0x0201
A.  Content Membership—Identifies Membership Group
B.  Content Nationality—Nationality of Content Provider
G.  ContentAction—Type of Content Action Behavior
    AudioMedia = 0x0001
    VideoMedia = 0x0002
    WebMedia = 0x0003
H.  ContentClickAction—Type of Content Click Action Behavior
    (Action = 1 byte, 31 bytes of parameters)
    WebAction = 0x1
    EventAction = 0x2
    Where: if WebAction then next 31 bytes specify URL
        If EventAction then EventCodes =
I.  ContentProviderID—Content Source Provider Id
J.  ContentCategoryID—Content Media Genre Category
K.  ContentEncodingScheme—Content Encoding Type
    MP3 = 0x01
    ASF = 0x02
    AAC = 0x03

TABLE 2-continued

MP4 = 0x04
    WAV = 0x05
    PCM = 0x06
    WMA = 0x07
L.  ContentTitle—Content Title Ascii String
M.  ContentStartDate—Gregorian Calendar Start Date
N.  ContentEndDate—Gregorian Calendar End Date
O.  ContentMaxPlays—Max Times to play content (−1 = no limit)
P.  ContentFrequency—The frequency with which this ad should
        be played indicated by ContentFreqUnitSize
Q.  ContentFreqUnitSize—The number of units to play content
        (1 unit = 1 day)
R.  ContentGeographicTag—Geographic Info (zipcode, country code)
S.  ContentDemographicTag—Demographic Info (1 byte for each)
        (age, nationality, gender, income, occupation,
        education, married)
T.  ContentDiscardRule—Exception Handling Discard
        Discard on Failure = 0x01
        Alarm on Failure = 0x02
U.  PublisherContentId—Publisher Content Provider Id The media stream 94 is provided by the publisher portal 24 and the content stream 110 is provided by the spot content provider 26.

Within the home client 28, a profile is produced of the user for the processor of the home client 28. This profile consists of a group of parameters, each having a particular value. The parameters for a user profile is shown in Table 3.

TABLE 3

| A. | Geographic Id (8 bytes) (zipcode, country code) |
| B. | Demographic Id (8 bytes) (age, nationality, gender, income, occupation, education, marital status) |
| C. | User Info (64 bytes) (first name, last name) |

Should the user not provide input for the home client profile, a default user profile in the geographic information based on the user's IP address.

The content stream 110 is received by the home client 28 by the stream receiver 74 and the information in each of the spot content frames is examined and compared to the profile parameter values of the home client 28 user to select which content units should be associated with this particular home client user. For the present example, it is assumed that matches are made with content units 114, 118 and 120. Only these selected content units are stored at the home client 28.

The stream receiver 74 detects each of the spot markers within the media stream 94 to determine the location for inserting the selected content units. The media units are provided continuously to the media device player but at the points of the spot markers, the selected content units are inserted to produce an information data stream 124 that is customized to the particular home client 28 user. The information data stream 124 comprises the content unit 114, which perhaps is an advertisement or public service announcement, followed by the media unit 102, which could be a series of songs, or other programming material. Content unit 114 is inserted in the media stream 94 at the position of spot marker 102a. Following the media unit 102 there is a further content unit 118. The content unit 118 is inserted at the location of the spot marker 100a. Following the content unit 118 there is media unit 100 followed by content unit 120, which is inserted at the location of spot marker 98a. Continuing with the information data stream 124 there is the media unit 98 followed by the content unit 114 at the location of spot marker 96a. The content units 114, 118 and 120 are repeated in a round robin basis until they expire or new content units are received.

The operation of the present invention is now described in reference to FIGS. 1 and 2. A user such as home client 28 requests streaming media content from the publisher portal 24 via the telecommunications network 22. The portal 24 then queries the user to find out whether or not the home client 28 already contains a previously loaded package of software for spot content targeting. This includes the stream receiver 74, spot scheduler 76, and spot auditor 80. If already loaded, the publisher portal 24 proceeds to transfer streaming media through channels 40 and 44 to the home client 28. If not loaded, the user of the home client 28 is requested to download this package of software. If the user concurs, the software is transferred to the home client 28. Once the download of this software package is completed, this software is executed to self extract and install itself into the home client 28 processor. Once initiated, this software initiates a registration request with the user of the home client 28 to obtain values for the user profile parameters. This information is provided to the spot content provider 26. The registration requests the user's geographic and demographic profile information, such as zip code, age, gender, and income. This information is stored at the home client 28 as a user profile and is further transferred to the spot content provider 26 to indicate that a new user has joined the network and has requested spot content data.

As an example, each of the media 102, 100 and 98 can comprise approximately 30 minutes of music and the content units 114, 118 and 120 can each comprise a 30 second commercial.

The spot content provider 26 is capable of accepting multiple home client session requests and managing multiple home client sessions simultaneously. Once a home client 28 user requests to join the network and has been accepted by the spot content provider 26, the provider 26 will then start transmitting the content stream 110 via server 72 to the home client user's computer system. Each spot content frame has parameters that correspond to the user profile parameters, and values for these parameters are provided in each spot content frame by provider 26. The home client software will then only store the received spot content units that match the configured geographic and/or demographic information that was entered in the user profile during the previous registration process. As further described below, the spot content units stored at the home client 28 include information indicating when the spot content unit is to be played, the spot content unit identification, the publisher identification of the spot content unit, the geographic and demographic profile for this spot content unit, and how long the spot content unit should be stored on the home client 28 processor.

The publisher portal 24 generates the media stream 94 which includes the spot markers, such as 96a and 98a, indicating what type of spot content unit should be placed at this position in the media stream, the geographic and demographic information of the spot content unit, and the type of streaming media 94 content that is being listened to by the home client 28 user.

Figure 3:
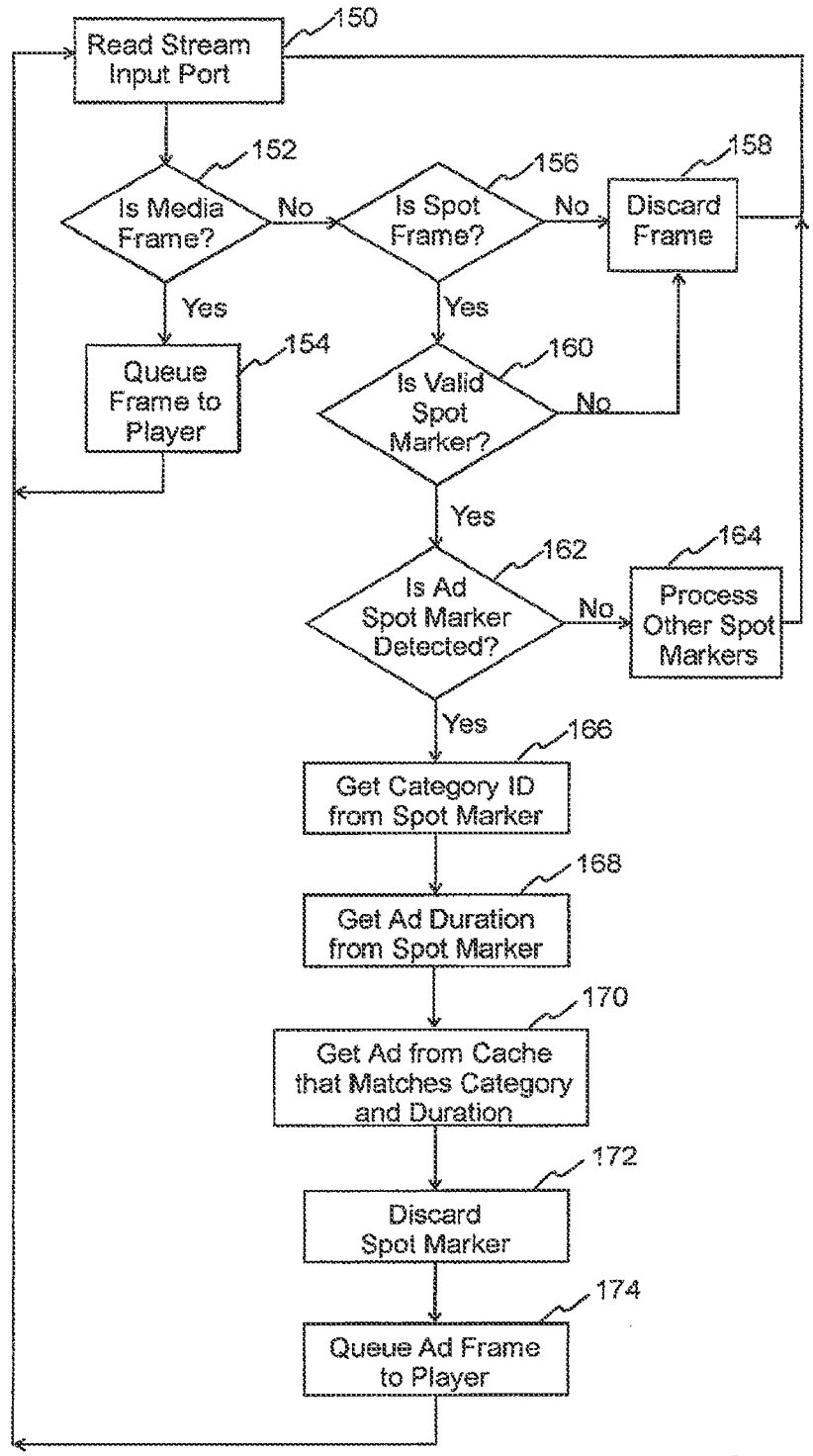
FIG. 3 is a flow diagram illustrating the receipt and processing of a media stream with spot markers at a home client.
Figure 4:
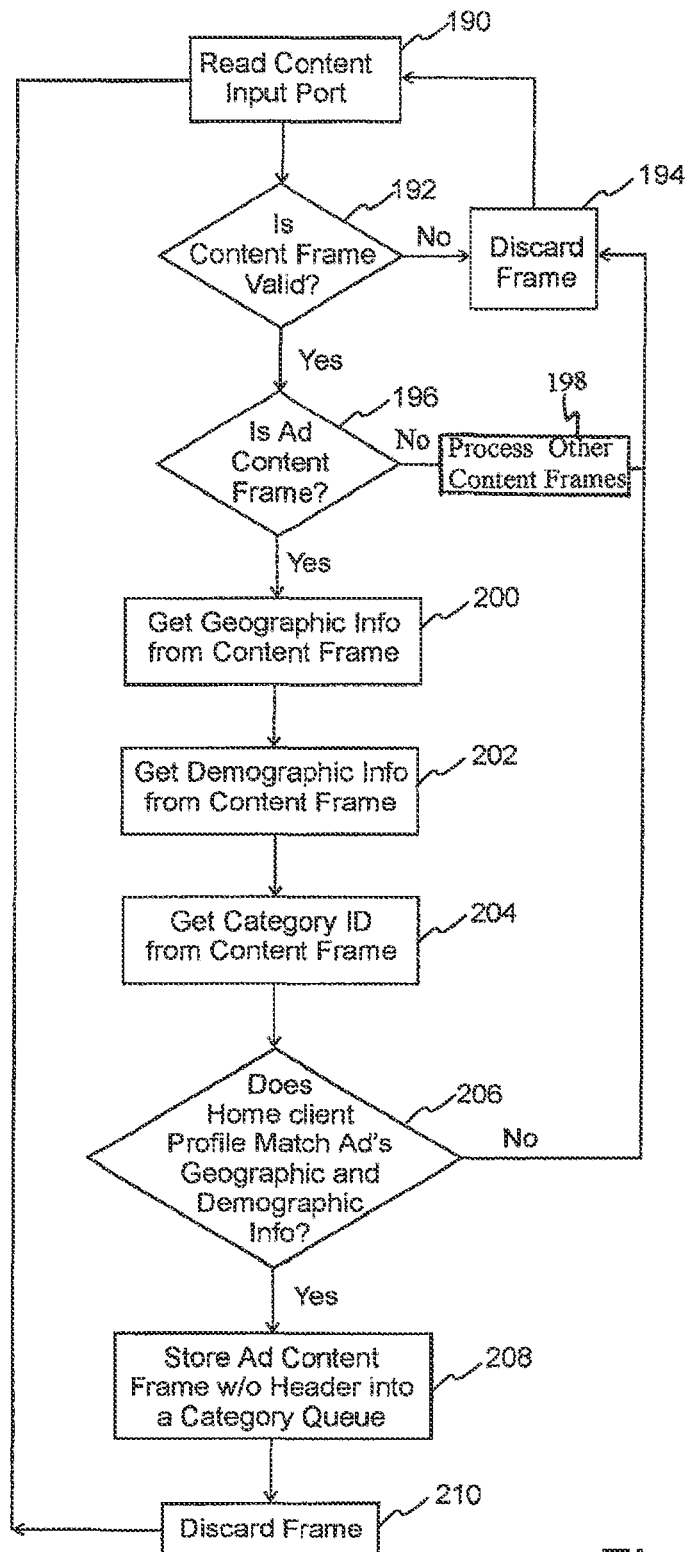
FIG. 4 is a flow diagram illustrating operation at the home client of receiving a content stream with content units and spot content frames and selectively storing spot content which matches the user profile.

A more detailed description of the operation of the software within the home client 28 is described in reference to FIGS. 3 and 4. FIG. 3 represents the processing of the media stream 94, and FIG. 4 represents the processing of the content stream 110.

Referring to FIG. 3, at step 150 the stream receiver 74 reads the media stream 94, which is received from the publisher portal 24 via the telecommunications network 22. Continuing to a question step 152, an inquiry is made to determine if the frame which has, been received is a frame for a media unit, such as 98, or is a frame for a spot marker, such as 98a. If a media frame has been received, the Yes exit is taken from step 152 for entry to step 154 in which the received media frame is queued to the player device 78. The media frame is stored in a cache and entry is made back to repeat the operations beginning at step 150.

If a media frame has not been received at step 152, the No exit is taken to question step 156 to determine if a spot marker frame has been received. If a spot marker frame is not identified, the No exit is taken to operational step 158 to discard the frame and return to step 150. But, if a spot frame has been identified at step 156, the Yes exit is taken to step 160. An examination is made in step 160 to determine if the received spot marker frame is valid. The validity of the spot marker is determined by comparison of the spot marker's frame identification parameter with the home client's software version ID. If the received spot marker frame received is not valid, the No exit is taken to discard the frame at step 158 and return to entry step 150. If the received spot marker frame is determined to be valid, the Yes exit is taken from step 160 to step 162.

At step 162 an examination is made to determine if the received spot marker is designated as an advertisement spot marker. If not, operation is transferred to a processing step 164 which processes other types of spot markers in the same manner as further described below in steps 166-174. Other types of spot markers include public announcements, local weather, local traffic, or other types of content units.

If an advertisement spot marker has been detected at step 162, control is transferred via the Yes exit to step 166 to obtain the category ID from the spot marker. Next, entry is made to step 168 to extract the ad duration from the selected spot marker. Duration marks how long a spot can exist within the stream. Category defines the type of listening category the user channel has selected.

From step 168, operation is transferred to step 170 to select the advertisement embodied in a content unit which has been stored in the cache and that matches the category and duration now determined for the selected spot marker. At step 172, the examined spot marker is discarded. Next, at step 174 the frame (content unit) for the selected ad for queuing to the media player device 78. The selection and storage of the ad content is described in reference to FIG. 4. Upon completion of step 174, operation is returned to the entry step 150.

Steps 150 through 172 and 174 are performed by the stream receiver 74 and step 170 by the spot scheduler 80.

The processing of the content input stream 110 at the home client 28 is described in reference to FIG. 4. Entry is begun at a step 190 to read the content stream 110 from the input port for receiving the content stream. At this point only the spot content frames, also referred to as headers, such as 112a and 114a, are examined. At step 192, a determination is made if the received spot content frame is valid. Validity is determined by comparison of the content frame identification parameter with the home client's software version ID. If the spot content frame is not valid, the No exit is taken to a discard frame step 194 and control is then returned to the entry step 190.

If the spot content frame is determined to be valid at step 192, the Yes exit is taken to step 196 to determine if the content frame is for an advertisement. If an ad content frame is present at step 196, entry is made via the Yes exit to step 200 for extracting the geographic information from the spot content frame under examination. If an ad content frame is not detected at step 196, the No exit is taken to step 198 to process other content frame types in a similar manner as described in steps 200-210. Other types of content frames include news reports, weather reports, traffic reports, public announcements, status identification and control requests.

Steps 190 through 204, 208 and 210 are performed by the stream receiver 74 and step 206 by the spot scheduler 80.

At step 202, the demographic information from the spot content frame is extracted. At step 204, a category ID from the spot content frame is extracted.

Following step 204, entry is made to a question step 206 to determine if the previously stored profile parameter values for the user of the home client 28 matches the selected geographic and demographic information extracted for the received spot content frame. If not, the No exit is taken to discard the frame and return to the entry step 190. If there is a match, the Yes exit is taken from step 206 to step 208 for storing the ad content unit which corresponds to the spot content frame examined, into a category queue. Next, at step 210, the spot content frame which has been examined is discarded and control is returned to the entry step 190. This process examines each received spot content frame to determine those that match the specific user which received the content stream and stores the specific content units that have been matched. Thus, this builds up a selection of the ad content in a cache which is utilized as described previously in reference to FIG. 3.

The ad insertion process disclosed in the Figures is only an instance of the possible choices available in the disclosed spot marker technology since a spot marker identifies content to be inserted in a hierarchical fashion. The following relationships exist in a spot marker.

Spot type=(announcement date or control information)
IF (spot-type=announcement data), then the possible announcement types exist, (but not limited to) advertisement
weather report
news event report
traffic report
stock quote report
public service report
IF (spot-type=control information), then the possible control types exist, (but not limited to) stop insertion
resume insertion Other spot markers can be processed to test for each of the announcement type marker fields, and if these types are not set, check for control type marker values. If those marker fields are not set, discard the spot marker frame and return control to reading the stream input port. If any spot type field is valid, then the content is fetched by the spot scheduler and that content is played by its player device within the home client.

Figure 5:
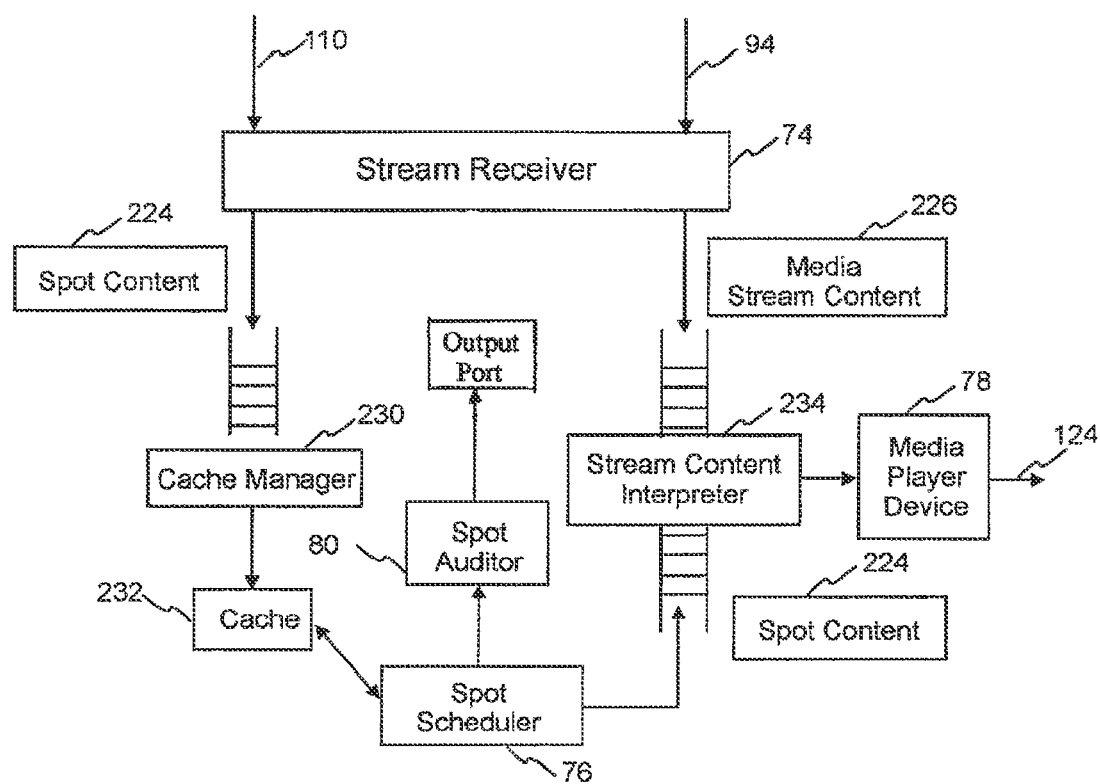
FIG. 5 is a functional block diagram further illustrating operations in a home client for combining spot content units with media stream units.

The operations that are carried out within the home client 28 are further shown in FIG. 5. The stream receiver 74 receives the content stream 110, which includes advertisements, and the media stream 94, which includes media such as music entertainment. Media stream content is shown by numeral 226. The content stream 110 selected content units such as 224 are provided to a cache manager 230 which transfers the received digital information to a cache 232. All of the content units which have been determined to match the home client profile are stored in the cache 232.

The spot scheduler 76 selects the advertising content units such as 112 and 114 which are provided to a stream content interpreter 234. The media units in the media stream 94 are likewise provided to the stream content interpreter 234. This interpreter interleaves the media content with the spot content (advertising) to produce a sequential stream which is provided to the media player device 78 for producing the information data stream 124 that is provided to the user of the home client.

The present invention can be used by advertisers, the provider 76, for a specific advertising campaign. For the campaign, content units such as 112 and 114 are prepared which comprise the advertisements to be distributed in the campaign. An important aspect in advertising is auditing to determine how many times a particular advertisement has been displayed to a potential consumer. This often determines the payment that the advertiser must make to the provider of media in which the advertisement is carried.

When the ad server 72 (FIG. 1) transmits the content stream 110 to the network 22, the server 72 record the information that was transmitted in an auditing table. In accordance with the present invention, there may be a very large number of the spot content providers such as 26 operating at any one time, as well as a large number of the publisher portals 24 operating at one time. The home client 28 user selects the particular publisher portal 24 and the information in the spot markers received from the portal 24 identifies the particular provider 26 to be connected to the home client 28 for providing the content stream 110.

Once the content stream 110 has arrived at a home client 28 processor, software in the home client determines whether or not parameter values in the received spot content frames match the geographic and demographic profile of the user. If there is a match, the content units, such as 112 and 114, are stored and classified according to the corresponding spot content frames.

The home client 28 stream receiver 74 also receives the media stream 94 and examines the spot markers within this stream. These spot markers indicate which of the content units previously stored should be inserted into the information data stream 124 that is provided to the user. The stored content units are then inserted and the spot scheduler 76 records in an audit table information comprising the content unit ID (6 things total). There is also a record of the number of times that each content unit was inserted into the stream. An indicator of whether the complete content unit was provided to the user is also made, since the user has the capability of terminating the play of the content unit before it is completed. As further described below, this audit log is periodically transmitted to the ad server 72 where this information is provided to the particular ad campaign manager 70. The ad campaign manager can then analyze and classify this information to determine the value and effectiveness of the advertising campaign.

The audit log maintained at the home client 28 for each displayed ad includes the following information:
1. Ad identification
2. Geographic location (of the user)
3. Demographic information (of the user)
4. Category
5. Publisher
6. Content played/skipped A user can terminate an ad before it is completed and the state of either complete play or termination (skipped) is recorded in the audit log.

Figure 6:
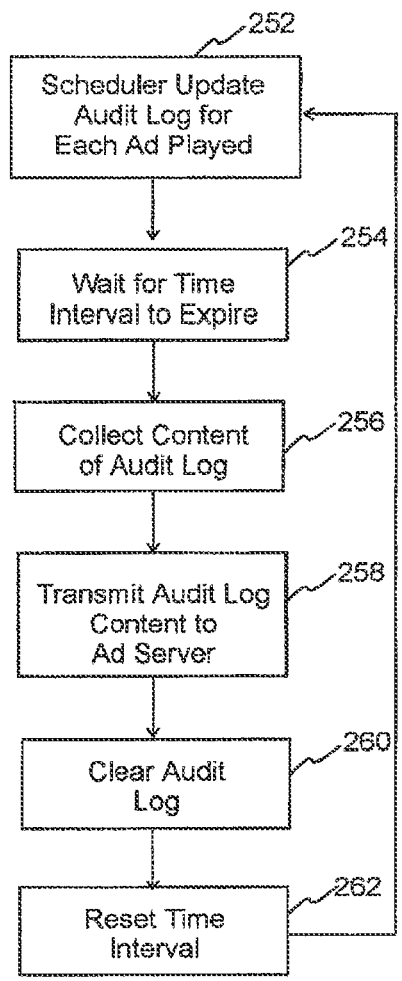
FIG. 6 is a flow diagram illustrating the operation of the spot auditor shown in FIGS. 1 and 5.

The operation of the spot auditor 80 in each of the home clients is described in reference to FIG. 6. In step 252 the spot scheduler 76 updates an audit log for each ad that is played. The information recorded for each ad that is play is that shown immediately above.

The information for the ads that are played is collected over a period of time and in step 254 the expiration of a predetermined time interval is detected. Continuing to step 256, the content of the audit log is collected.

After the content of the audit log is collected, in step 258 this content is transmitted to the ad server 72. In step 260, the audit log is cleared followed by resetting the time interval in step 262. Next, control is returned to the step 252 to resume recording the audit log for each ad that is played.

Figure 7:
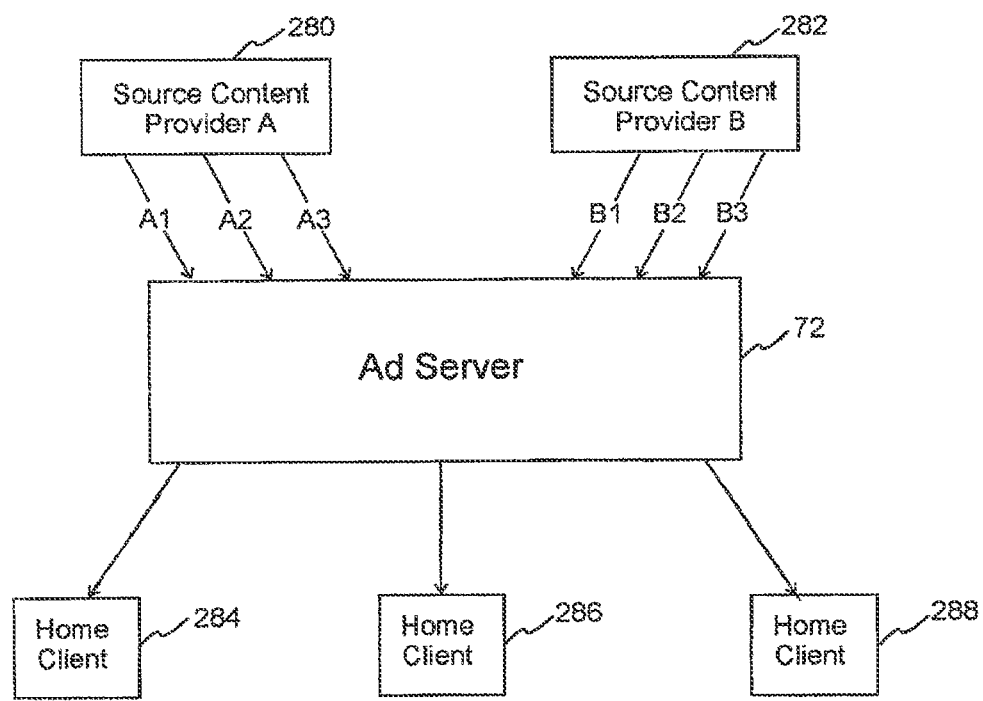
FIG. 7 is a functional diagram representing multiple source content (advertising) providers conducting multiple advertising campaigns with advertising content being supplied to multiple home clients.

The present invention can be utilized with multiple advertising campaigns concurrently conducted by multiple source content (advertisers). Referring to FIG. 7, two source content providers A and B are identified respectively by reference numerals 280 and 282. The provider A produces advertisement campaigns A1, A2 and A3. The source content provider B (282) is producing advertising campaigns B1, B2 and B3. An advertising campaign is typically conducted by distributing one or more advertisements for a particular product or service. The content providers 280 and 282 correspond to the spot content provider 26 previously described in reference to FIG. 1. Each of these providers encodes the advertisements, which comprise the spot content units, with the corresponding information in the spot content frames, as described in reference to FIG. 2. This information selects the targeted audience: All of the content streams produced by the providers 280 and 282 are transmitted to the ad server 72 where they are then communicated via the telecommunications network 22 to various home clients represented as 284, 286 and 288. As previously described, a home client is provided with a content stream 110 when it is logged on to receive continuing media from a publisher. All of the clients shown receive the same content stream.

In a further aspect of the present invention, there can be multiple content streams provided to respective groups of home client users. The groups are defined by the user profile information. The spot content provider, such as 26, can specify to the ad server 72, which of groups are to receive a specific content stream. The membership of users in a group can also be defined by a publisher based on the type of media they are providing. 20. A home client user can select a publisher that is participating in a certain advertising campaign and that home user will receive the content stream associated with that campaign. For example, a sports broadcaster may want to grant exclusive advertising rights to one or a group of advertisers and the content stream for that publisher would include only the advertising content for the selected advertisers.

An example for the present invention is presented for two home client users having the profiles shown below in Tables 4 and 5.

TABLE 4

| HomeClient #1 Profile |
| --- |
| Geographic = Maryland |
| Demographic = |
|    15 years old |
|    male |

TABLE 4-continued

| HomeClient #1 Profile |
| --- |
| us |
| no income |
| high school |
| not married |
| User info = none |

TABLE 5

| HomeClient #2 Profile |
| --- |
| Geographic = Virginia |
| Demographic = |
|    15 years old |
|    male |
|    us |
| no income |
| high school |
| not married |
| User info = none |

A spot marker included in the streaming audio being received by two home client users is shown in Table-6.

TABLE 6

| Spot Marker = |
| --- |
| SpotType = Advertisement |
| PublisherId = Publisher A |
| Ad Content Id = none |
| Geographic Id = none |
| Demographic Id = none |
| Control Flags = none |
| Membership Id = none |
| Discard Rule = discard |
| Authentication = none |
| Spot Duration = 30 sec |
| Category Id = Rock Music |

First and second example spot content frames are shown in Tables 7 and 8.

TABLE 7

| SpotContent Frame # 1 = |
| --- |
| DomainId = Domain A |
| ContentId = Content Id # 1 |
| Content Type = Ad Announcement |
| ContentLanguage = English |
| ContentProviderNationality = US |
| ContentAction = AudioMedia |
| ContentClickAction = WebAction |
|    URL = www.adProvider1.com |
| ContentProviderId = Ad Provider 1 |
| ContentEncodingScheme = mp3 |
| ContentTitle = CokeAd |
| ContentStartDate = Jan 1 |
| ContentEndDate = Feb 1 |
| ContentMaxPlays = 30 |
| ContentFrequency = 30 |
| ContentFreqUnitSize = 30 |
| ContentCategory = Rock Music |
| ContentGeographicTag = Virginia |
| ContentDemographicTag = |
|    15 years old, |
|    male, |
|    us, |
|    no income, |
|    high school, |
|    not married) |

TABLE 7-continued

SpotContent Frame # 1 =

ContentDiscardRule = none
PublisherContentId = none

TABLE 8

SpotContent Frame # 2 =

DomainId = Domain A
ContentId = Content Id # 2
Content Type = Ad Announcement
    ContentLanguage = English
ContentProviderNationality = US
ContentAction = AudioMedia
ContentClickAction = WebAction URL = www.adProvider1.com
ContentProviderId = Ad Provider 1
ContentEncodingScheme = mp3
ContentTitle = McDonald's Hamburger Lady Ad
ContentStartDate = Jan 1
ContentEndDate = Feb 1
ContentMaxPlays = 30
ContentFrequency = 30
ContentFreqUnitSize = 30
ContentCategory = Rock Music
ContentGeographicTag = Virginia
ContentDemographicTag =
    15 years old,
    male,
    us,
    no income,
    high school,
    not married)
ContentDiscardRule = none
PublisherContentId = none In the present example, the spot marker in Table 6 is transmitted in a media stream that has been selected by both the home client users of the profiles shown in Tables 4 and 5. The spot content frame #1 shown in Table 7 and spat content frame #2 shown in FIG. 8 represent the spot content frames such as 112a and 114a shown in FIG. 2. Note that the demographic tags (profile parameters) in both Table 7 and Table 8 for those spot content frames match the demographic parameter values for the home client users as shown in the profiles in Tables 4 and 5. However, both of the spot content frames shown in FIGS. 7 and 8 require a geographic selection of "Virginia." The home client user profile in Table 4 has the geographic value of "Maryland" while the home client user in Table 5 has the geographic value of "Virginia." Therefore the processor for the home client #2 user as shown in Table 5 will detect a match for both the spot content frame shown in Table 7 and the spot content frame shown in Table 8. The processor for client #2 will then store the ad content corresponding to both of these frames.

When the spot marker shown in Table 6 arrives in the media stream being provided to the home client #2 user, a comparison will be made between the category ID, that is, "rock music" to the content category of the stored advertisements, which are also "rock music." Thus, upon the first receipt of the spot marker shown in Table 6 in the media stream, the first received one of the spot contents corresponding to spot content frame #1 will be played to the home client #2 user, as represented in Table 5. This will be a 30 second advertisement. At the next occurrence of the spot marker in Table 6 in the media stream being received by the home client user #2, the second spot content associated with the spot content frame #2 will be played to the home client #2 user. This, likewise, will be a 30 second advertisement. These advertisements will be played provided they are within the appropriate dates specified in the spot content frames.

The present invention provides customized spot content to individual users even though the same spot content stream is being transmitted to all members of a group of such users.

Although several embodiments of the invention have been illustrated in the accompanying drawings and described in the foregoing Detailed Description, it will be understood that the invention is not limited to the embodiments disclosed, but is capable of numerous rearrangements, modifications and substitutions without departing from the scope of the invention.

What is claimed is:

1. A computer-implemented method for providing spot content in a media stream, the method comprising the following operations performed by at least one processor:
    receiving, at a client system over an electronic network, a media stream comprising at least one media content unit and at least one spot marker designating a spot location at which to insert a spot content unit into the media stream, the at least one spot marker including spot content selection information for selecting a spot content unit to insert at the spot location;
    detecting, at the client system, the at least one spot marker contained in the received media stream; and
    in response to the detection of the at least one spot marker:
        selecting at least one spot content unit based on the spot content selection information for the spot location designated by the detected at least one spot marker; and
        reproducing the selected at least one spot content unit and the media stream.

2. The method of claim 1, wherein reproducing further comprises generating a data stream comprising the selected at least one spot content unit inserted into the media stream at the spot location designated by the detected at least one spot marker.

3. The method of claim 1, wherein the spot content selection information includes at least one of a type, a duration, a genre category, demographic information, or geographic information for selecting a spot content unit to insert at the spot location.

4. The method of claim 1, further comprising updating a log based on reproducing the at least one spot content unit.

5. The method of claim 4, further comprising sending the log to a server after the expiration of a time interval.

6. The method of claim 1, wherein the media stream comprises at least one of audio, video, or text.

7. The method of claim 1, wherein reproducing the selected at least one spot content unit and the media stream comprises presenting the at least one spot content on the client system as an interstitial.

8. An apparatus comprising:
    at least one processor; and
    a storage device comprising instructions that, when executed by the at least one processor, cause the at least one processor to:
        receive, over an electronic network, a media stream comprising at least one media content unit and at least one spot marker designating a spot location at which to insert a spot content unit into the media stream, the at least one spot marker including spot content selection information for selecting a spot content unit to insert at the spot location;
        detect the at least one spot marker contained in the received media stream; and
        in response to the detection of the at least one spot marker:

select at least one spot content unit based on the spot content selection information for the spot location designated by the detected at least one spot marker; and reproduce the selected at least one spot content unit and the media stream.

9. The apparatus of claim 8, wherein the instructions further cause the at least one processor to generate a data stream comprising the selected at least one spot content unit inserted into the media stream at the spot location designated by the detected at least one spot marker.

10. The apparatus of claim 8, wherein the spot content selection information includes at least one of a type, a duration, a genre category, demographic information, or geographic information for selecting a spot content unit to insert at the spot location.

11. The apparatus of claim 8, wherein the instructions further cause the at least one processor to update a log based on reproducing the at least one spot content unit.

12. The apparatus of claim 11, wherein the instructions further cause the at least one processor to send the log to a server after the expiration of a time interval.

13. The apparatus of claim 8, wherein the media stream comprises at least one of audio, video, or text.

14. The apparatus of claim 8, wherein the instructions further cause the at least one processor to present the at least one spot content on the client system as an interstitial.

15. A non transitory computer readable medium comprising instructions that, when executed by at least one processor, cause the at least one processor to:

receive, over an electronic network, a media stream comprising at least one media content unit and at least one spot marker designating a spot location at which to insert a spot content unit into the media stream, the at least one spot marker including spot content selection information for selecting a spot content unit to insert at the spot location;

detect the at least one spot marker contained in the received media stream; and in response to the detection of the at least one spot marker:
select at least one spot content unit based on the spot content selection information for the spot location designated by the detected at least one spot marker; and reproduce the selected at least one spot content unit and the media stream.

16. The medium of claim 15, wherein the instructions further cause the at least one processor to generate a data stream comprising the selected at least one spot content unit inserted into the media stream at the spot location designated by the detected at least one spot marker.

17. The medium of claim 15, wherein the instructions further cause the at least one processor to update a log based on reproducing the at least one spot content unit.

18. The medium of claim 17, wherein the instructions further cause the at least one processor to send the log to a server after the expiration of a time interval.

19. The medium of claim 15, wherein the media stream comprises at least one of audio, video, or text.

20. The medium of claim 15, wherein reproducing the selected at least one spot content unit and the media stream comprises presenting the at least one spot content on a client system as an interstitial.

* * * * *